UNITED STATES PATENT OFFICE.

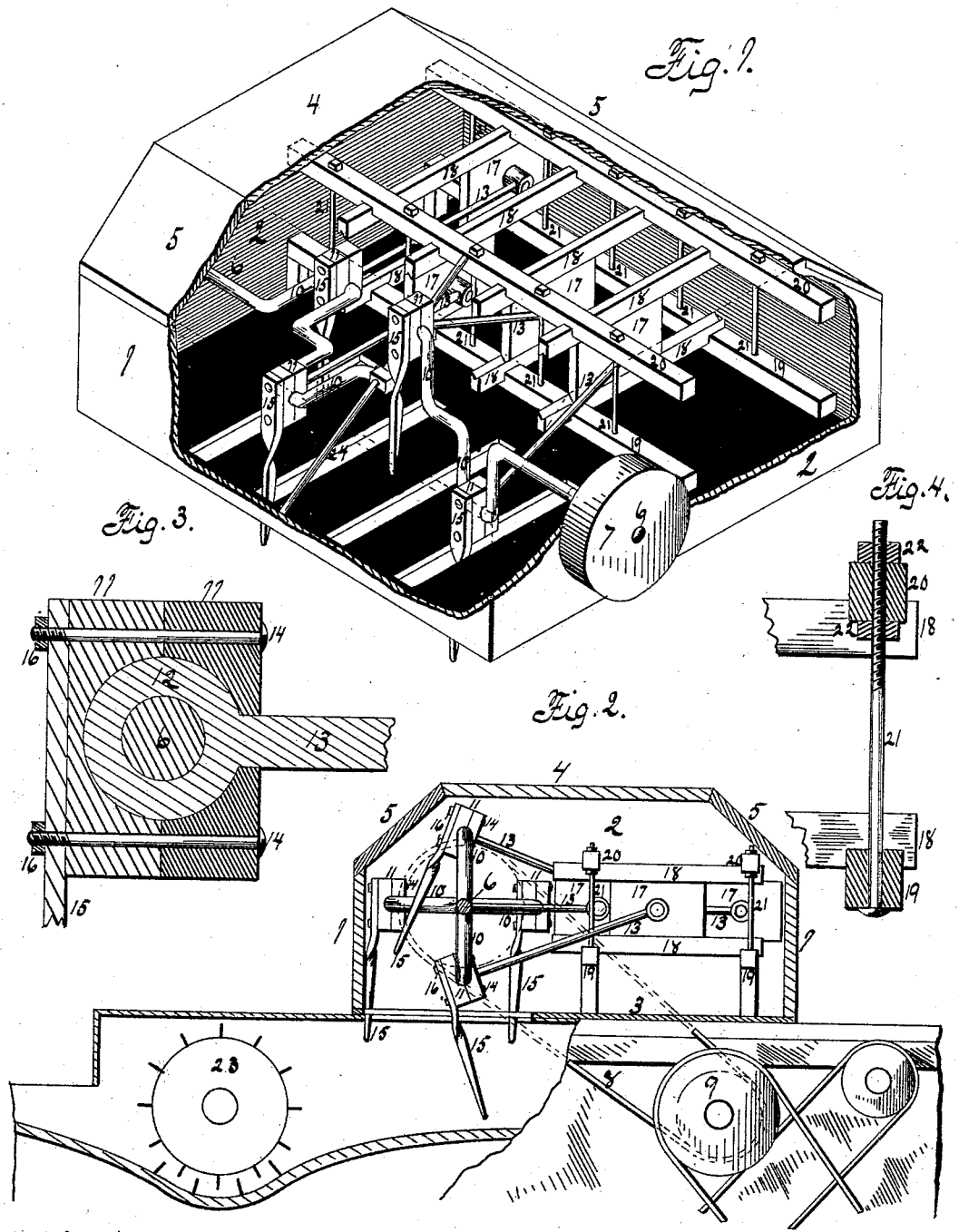

ISAAC MEAD, OF BELOIT, WISCONSIN.

THRASHING-MACHINE.

SPECIFICATION forming part of Letters Patent No. 418,039, dated December 24, 1889.

Application filed August 26, 1889. Serial No. 321,987. (No model.)

*To all whom it may concern:*

Be it known that I, ISAAC MEAD, a citizen of the United States, residing at Beloit, in the county of Rock and State of Wisconsin, have invented certain new and useful Improvements in Thrashing-Machines, of which the following is a specification.

The object of this invention is the attachment of a device for raking the straw from the cylinder of the thrashing-machine after it has passed under the cylinder on its way to the beaters.

This invention consists of a series of teeth pivoted eccentrically, so that in their revolutions they will descend into the straw, carrying it backward away from the cylinder, and in their upward movement will ascend clear of the straw.

In the accompanying drawings, Figure 1 is an isometrical representation of my attachment with portions of the outer casing broken away to show the parts more clearly. Fig. 2 is a section through the outer casing, showing the attachment in position on a thrashing-machine. Fig. 3 is a vertical section through one of the heads. Fig. 4 is a section showing the adjustment of the guideways.

I have prepared a casing for the reception of my improvements, which consists of vertical sides 1, ends 2, bottom 3, and top 4, having hinged lids 5, through which an attendant is able to adjust the parts. Within this casing and near one end is secured a shaft 6, on the projecting end of which is secured a pulley 7, which is connected by a belt 8 to a pulley 9 of the thrashing-machine, and to which motion is imparted from a prime mover. This shaft 6 is formed with four bends 10, each at right angles to the other. At each of these bends is supported a head, consisting of two sections 11, each having a semicircular recess, within which is placed the circular end 12 of a guide-rod 13. Bolts 14 are passed through the sections, one on each side of the center. A tooth 15 is placed on the projecting ends of the bolts, and screw-nuts 16 clamp the parts together. The shaft 6 is free to turn in the head, while the sections are clamped firmly to the end of the guide-rod. The free ends of the guide-rods are pivoted to sliding heads 17, which slide in grooved guideways 18, supported by lower cross-bars 19 and upper cross-bars 20. The guideways are held separated by screw-bolts 21, passing up through the lower bar 19 and through the upper bar 20. Screw-nuts 22 are placed on both sides of the upper bar, as clearly shown at Fig. 4. By these screw-nuts I am able to raise or lower the upper bar to adjust it with relation to the sliding heads to take up any wear of the parts.

At Fig. 2 I have shown my improvements as applied to a thrashing-machine. The casing is placed on top of the thrashing-machine in rear of the cylinder 23, so that as the grain leaves the cylinder the teeth 15 will alternately descend into the grain and force it on its way to the beaters, thereby relieving the cylinder.

My improvements are especially adapted for use in connection with wet grain, when it is liable to clog the machinery of the thrashing-machine. The teeth are controlled in their movements by the guide-rod as it moves in the guideways. A central brace 24 connects the shaft with the casing about midway of its length and gives a firm support for the shaft.

I claim as my invention—

1. In a thrashing-machine, the combination, with a thrashing-cylinder, of a horizontal shaft bent in crank form, teeth supported by the cranks, upper and lower guideways made adjustable toward or from each other, a sliding head movable in the guideways, and a connection between the sliding head and teeth, substantially as set forth.

2. In a thrashing-machine, the combination, with a shaft bent in crank form, of a connecting-rod having an eye loosely engaged thereon, a two-part head embracing said shaft and the said eye and clamped to turn with the eye independently of the said shaft, and a tooth secured to the said two-part head, substantially as set forth.

3. In a thrashing-machine, the combination, with the rotary shaft provided with crank portions, of a connecting-rod having an eye loosely engaged thereon, a two-part head embracing said shaft, and the said eye to turn with the head independently of the shaft, a tooth, and bolts serving the twofold purpose of clamping the two-part head to the eye of the connecting-rod and for securing the tooth to said head, substantially as set forth.

ISAAC MEAD.

Witnesses:
O. H. ORTON,
P. J. MORRISON.